(12) United States Patent
Wang et al.

(10) Patent No.: US 11,733,096 B2
(45) Date of Patent: Aug. 22, 2023

(54) HIGHLY-INTEGRATED ULTRAHIGH-RESOLUTION MID-INFRARED DUAL-COMB SPECTROSCOPY MEASUREMENT DEVICE AND METHOD

(71) Applicant: Xi'an Institute of Optics and Precision Mechanics, Chinese Academy of Sciences, Shaanxi (CN)

(72) Inventors: Leiran Wang, Shaanxi (CN); Qibing Sun, Shaanxi (CN); Lei Shi, Shaanxi (CN); Wenfu Zhang, Shaanxi (CN)

(73) Assignee: XI'AN INSTITUTE OF OPTICS AND PRECISION MECHANICS OF CAS, Shaanxi (CN)

( * ) Notice: Subject to any disclaimer, the term of this patent is extended or adjusted under 35 U.S.C. 154(b) by 170 days.

(21) Appl. No.: 17/352,327

(22) Filed: Jun. 20, 2021

(65) Prior Publication Data

US 2022/0113191 A1  Apr. 14, 2022

(30) Foreign Application Priority Data

Oct. 10, 2020  (CN) .................. 202011078202.X

(51) Int. Cl.
*G01J 3/433*  (2006.01)
*G01J 3/02*  (2006.01)
(Continued)

(52) U.S. Cl.
CPC ............. *G01J 3/433* (2013.01); *G01J 3/0229* (2013.01); *G01J 3/108* (2013.01);
(Continued)

(58) Field of Classification Search
CPC ...... G01J 3/433; G01J 3/108; G01J 2003/423; G01J 2003/4334; G01N 21/3504; G02F 1/3536; G02F 1/3551
See application file for complete search history.

(56) References Cited

U.S. PATENT DOCUMENTS 10,088,414 B2 * 10/2018 Lipson .................. H01L 31/105
10,197,442 B2 *  2/2019 Kieu ...................... G01C 19/72
2020/0064512 A1 *  2/2020 Stark ....................... G02F 1/365

OTHER PUBLICATIONS

Lu et al., "Two-colour dissipative solitons and breathers in microresonator second-harmonic generation," Nature Communications, (2023) 14:2798, p. 1-8. (Year: 2023).*

* cited by examiner

*Primary Examiner* — David P Porta
*Assistant Examiner* — Casey Bryant
(74) *Attorney, Agent, or Firm* — NKL Law; Allen Xue

(57) ABSTRACT

An ultrahigh-resolution mid-infrared (MIR) dual-comb spectroscopy (DCS) measurement device includes a pump unit, a microring resonator (MRR) unit, a modulation unit, a splitting unit, a testing unit, a signal detection unit, a power balance unit, a reference detection unit and a spectral analysis unit. The measurement method includes: adjusting the laser emitted by the pump unit to the MRR unit; adjusting the modulation unit and performing dual-frequency modulation; generating two sets of MIR optical frequency combs (OFCs) with different repetition rates and splitting the MIR OFCs into the test light and the reference light; performing photoelectric conversion on the test light and injecting the test light to the spectral analysis unit; performing photoelectric conversion on the reference light and injecting the reference light to the spectral analysis unit; and performing Fourier transformation and data processing on test results to obtain absorption spectrum of the to-be-tested sample.

15 Claims, 5 Drawing Sheets

(51) Int. Cl.
   *G01J 3/10* (2006.01)
   *G02F 1/35* (2006.01)
   *G02F 1/355* (2006.01)
   *G01N 21/3504* (2014.01)
   *G01J 3/42* (2006.01)
(52) U.S. Cl.
   CPC ....... *G01N 21/3504* (2013.01); *G02F 1/3536* (2013.01); *G02F 1/3551* (2013.01); *G01J 2003/423* (2013.01); *G01J 2003/4334* (2013.01); *G02F 2202/20* (2013.01); *G02F 2203/11* (2013.01); *G02F 2203/56* (2013.01)

HIGHLY-INTEGRATED ULTRAHIGH-RESOLUTION MID-INFRARED DUAL-COMB SPECTROSCOPY MEASUREMENT DEVICE AND METHOD

FIELD

The present application relates to a mid-infrared (MIR) dual-comb spectroscopy (DCS) measurement device and method, in particular to a highly-integrated ultrahigh-resolution MIR DCS measurement device and method.

BACKGROUND

Optical frequency combs (OFCs) correspond to equally-spaced ultrashort pulse sequences in temporal domain, as well as a series of extremely narrow lines uniformly distributed in frequency domain. They are naturally precise "marks" for spectral analysis, and especially suitable for analyzing and measuring the "fingerprint" of molecules' characteristic absorption spectrum, benefitting from their unique advantages of wide range and narrow linewidth. A dual-comb spectroscopy (DCS) uses two OFCs with slightly different repetition rates as interference light sources, and does not require any mechanical scanning arm compared with the Fourier-transform infrared spectroscopy (FTIR) that commonly-used for precision spectrum analysis. This not only well improves measurement stability but also increases the spectral resolution by ~4 orders of magnitude, up to the kHz level (typically tens of MHz for FTIR); and shortens the single sampling time by 4~5 orders of magnitude, up to the sub-millisecond level (typically tens of seconds for FTIR). The high resolution and rapid measurement capability of DCSs have contributed to revolutionary progresses in the field of precision laser spectrum, making them become one of the most accurate and powerful tools for spectroscopy research.

Conventional DCSs are usually built on femtosecond mode-locked lasers or electro-optic (EO) modulated OFCs; since restricted by big size, high weight, power & cost and low speed, they are still large research equipments used only in laboratories at present. In recent years, with the development of chip-scale microresonator fabrication technology, a high-Q low-mode-volume microring can increase the light field intensity by $10^8$, holding natural advantages of small size and low power consumption, as well as flexible and controllable dispersion and easy large-scale integratability with other active & passive photonic devices. Thus, efficient broadband OFC generation can be realized with remarkably reduced pump power requirement and repetition rate is increased by 2~3 orders of magnitude compared with that in conventional OFCs, paving a new way towards highly-integrated high-resolution DCS technique. Meanwhile, since most characteristic peaks of molecular absorption spectrum locate in the mid-infrared (MIR) region and the absorption intensity is usually 1~2 orders higher than that in the near-infrared (NIR) region, breakthrough in the microresonator-based MIR DCS technology is highly desired for practical applications. However, due to the thermal effect influence for the microresonator-based comb (microcomb) system, usually the high-power narrow-linewidth laser source is required to achieve stable comb generation, through rapidly scanning near the microcavity resonant frequency with precise control on the sweeping sequence, leading to a complex operation procedure. Especially for the MIR band, the performance of frequency-sweeping laser sources suffer from even severer restrictions, resulting in rather difficult generation along with complicated tuning process and, besides, two independent OFCs are often needed to build a DCS, leading to the high volume and cost for the whole system. Although compared with that of conventional DCSs, the system integration of the microresonator-based MIR DCS is improved, for now it can still only work in a laboratory, which seriously limits its practical application and future development.

SUMMARY

The present application aims at providing a highly-integrated ultrahigh-resolution MIR DCS measurement device and method, which can solve the problems of large size with bulky structure and limited resolution with restricted measurement speed for conventional DCS systems, as well as the problems of strong dependence on frequency-sweeping laser performance with complicated tuning procedure and complex system compositions for microresonator-based DCSs. The present application is capable of realizing a compact MIR DCS system with ultrahigh resolution, fast measurement speed and simple tuning process, offering a key tool for precision spectroscopy frontiers along with important research significance and extensive practical applications.

The key for a DCS depends on the construction of a high performance OFC system. The microcombs have smaller size, lower power consumption and higher repetition rate than conventional OFCs based on the optical fiber or solid-state mode-locked lasers. Compared with the commonly-used microresonator materials such as silicon, silicon dioxide, silicon nitride, magnesium fluoride and aluminum nitride, the lithium niobate ($LiNO_3$) possess both high second- and third-order nonlinearities, and hence can be widely used for the frequency doubling, difference frequency generation, four-wave mixing (FWM) and other processes. Particularly, one of its second-order nonlinearity, the EO effect (i.e., Pockels effect) enables fast electro-optic modulation (EOM) ability, which makes the $LiNO_3$ a unique and preeminent material taking advantage of its excellent low linear-loss property covering the NIR to MIR region. In addition, at present the microcomb generation technique mainly includes the EO frequency comb based on the EOM, and the Kerr frequency comb based on the FWM effect. The former type has a relatively low threshold but narrow bandwidth, while the latter just the opposite. Therefore, by simultaneously making full use of the third-order nonlinearity and EOM ability of the $LiNO_3$, it is possible to effectively overcome the shortcomings of conventional methods and realize more advanced and powerful DCS.

In order to solve aforementioned problems, based on the analysis above, the technical solution of the present application is to provide a highly-integrated ultrahigh-resolution MIR DCS measurement device, including a pump unit, a modulation unit, a microring resonator (MRR) unit, a splitting unit, a testing unit, a signal detection unit, a power balance unit, a reference detection unit and a spectral analysis unit;

the pump unit is used for providing a continuous-wave (c.w.) pump laser;

the modulation unit is used for providing dual-frequency modulating signal and performing EOM on the MRR unit;

the MRR unit is an MRR having both the EO effect and the FWM effect, used for receiving the c.w. pump laser and simultaneously generating two sets of broadband MIR combs with slightly different repetition rates through the EOM and FWM process;

the splitting unit is used for splitting the dual comb into two paths, one path being the test light and the other path being the reference light;

the testing unit is used for placing a to-be-tested sample and performing testing;

the signal detection unit is used for performing photoelectric conversion on the test light after absorbed by the to-be-tested sample, providing absorption spectrum information and injecting the test light to the spectral analysis unit;

the power balance unit is used for balancing the intensity difference between the dual combs of the test and the reference light path;

the reference detection unit is used for performing photoelectric conversion on the reference light, providing reference spectrum information and injecting the reference light to the spectral analysis unit; and the spectral analysis unit is used for comparing the beat signals of test dual comb and reference dual comb to obtain spectral testing information of the sample.

Further, in order to efficiently couple the c.w. pump laser to the MRR unit, the pump unit includes a narrow-linewidth c.w. laser source and a microscope objective connected in sequence; the narrow-linewidth c.w. laser source is used for emitting the high-power c.w. pump laser; and the microscope objective is used for compressing the mode area of the pump laser and then injecting the pump laser into the MRR unit.

Further, in order to receive the pump laser and simultaneously generate two sets of broadband MIR combs with slightly different repetition rates at low threshold power through the EOM and FWM process, the MRR unit is a $LiNO_3$ MRR. The $LiNO_3$ MRR is monolithic-integrated with a bus waveguide and a ring resonator, wherein the input port of the bus waveguide is used for receiving the pump laser, and the output port thereof is used for coupling the generated combs outside the MRR; the ring resonator is used for generating dual combs through the EOM and FWM process; the inner and outer sides of the ring resonator need N-type and P-type doping and are connected to the inner- and outer-side electrode, respectively.

Further, in order to provide dual-frequency modulating signal with slightly different center frequencies, the EOM is performed on the $LiNO_3$ MRR; and the modulation unit is a radio frequency (RF) generator, two signal output ports of the RF generator are both connected to the outer- (or inner-) side electrode of the $LiNO_3$ MRR, and the common GND port thereof is connected to the inner- (or outer-) side electrode of the $LiNO_3$ MRR.

Further, in order to split the generated dual combs into a path of test light and a path of reference light, the splitting unit is a beam splitter; the input port of the beam splitter is connected to the output port of the bus waveguide of the $LiNO_3$ MRR; and the output ports of the beam splitter are separately connected to the testing unit and the power balance unit.

Further, in order to perform photoelectric conversion on the test light after being absorbed by the to-be-tested sample, the signal detection unit is a first MIR photoelectric detector, used for providing absorption spectrum information and injecting the test light to the spectral analysis unit; and in order to perform photoelectric conversion on the reference light after being power balanced, the reference detection unit is a second MIR photoelectric detector, used for providing reference spectrum information and injecting the reference light to the spectral analysis unit.

Further, in order to enhance the signal contrast, the power balance unit is an adjustable attenuator, used for controlling the reference light intensity and balancing the intensity difference between the dual combs of the test light path and the reference light path.

Further, in order to analyze and compare beat signals of test dual comb and reference dual comb in real time, the spectral analysis unit is an oscilloscope.

The present application further provides a method for realizing MIR DCS measurement based on the device, including the following steps:

Step 1, adjusting the pump unit, so as to ensure that the emitted laser power meets the threshold condition for the EOM and FWM process in the MRR unit, and compressing the laser mode area to minimum and then injecting the laser into the MRR unit;

Step 2, adjusting the modulation unit to enable two channels thereof to separately output RF signals with slightly different center frequencies and performing dual-frequency modulation on the MRR unit, wherein the difference between center frequencies is typically some kHz to tens of MHz;

Step 3, in the case of dual-frequency modulation, automatically and simultaneously generating two sets of broadband MIR OFCs with slightly different repetition rates by the MRR unit through the EOM and FWM process, and splitting the broadband MIR OFCs into a path of test light and a path of reference light by the splitting unit;

Step 4, injecting the test light into the to-be-tested sample for absorption testing, obtaining absorption spectrum information and then performing photoelectric conversion by the signal detection unit; injecting the reference light into the power balance unit and adjusting the reference light to equal the intensities of reference dual comb and test dual comb so as to enhance the signal contrast, obtaining reference spectrum information and then performing photoelectric conversion by the reference detection unit; and Step 5, separately receiving real-time signals of the signal detection unit and the reference detection unit by two different channels of the spectral analysis unit, and performing Fourier transformation and data processing on test results to obtain absorption spectrum of the to-be-tested sample.

Further, Step 1 specifically includes:

adjusting the high-power c.w. pump laser emitted by the narrow-linewidth c.w. laser source, so as to ensure that the emitted laser power meets the threshold condition for the EOM and FWM process in the MRR unit; and adjusting the microscope objective to compress the mode area of the laser to minimum and injecting the laser into the MRR unit.

Further, Step 2 specifically includes:

Step 2.1, disconnecting the circuit between the RF generator and the $LiNO_3$ MRR, setting the center frequency f for one channel of the RF generator as equaling the intrinsic resonant frequency of the $LiNO_3$ MRR, setting the center frequency f' of another channel as close to but not equaling the intrinsic resonant frequency of the MRR, wherein the difference between f and f' is typically some kHz to tens of MHz while the output power is kept equal; and Step 2.2, connecting the circuit between the RF generator and the $LiNO_3$ MRR and performing dual-frequency modulation on the $LiNO_3$ MRR.

The present application has the following advantages:

1. The present application adopts the method of dual-frequency modulation on the MRR to realize simultaneous generation of two sets of MIR combs in a single MRR and construct a spectral measurement device on this basis, which breaks through the bottlenecks such as limited resolution, complex structure and measurement speed for conventional methods, and can realize a highly-integrated MIR DCS measurement device with high resolution, fast measurement and simple structure.

2. The present application uses ultrahigh-repetition-rate OFCs generated by the highly-integrated MRR as the test carrier, and can realize ultrahigh-resolution and ultrafast MIR DCS measurement. The OFC repetition rate is larger than 40 GHz, the spectral resolution is better than 10 kHz, and the measurement time is less than 0.5 ms, which are improved by about 2-3, 3-4, and 4-5 orders of magnitude than the conventional FTIR method, respectively.

3. The present application simultaneously makes full use of the EOM ability and strong third-order nonlinearity of $LiNO_3$, and the generated MIR dual OFCs have the both advantages of wide spectral coverage and low threshold power. The achievable spectral bandwidth is larger than 700 nm which is 5-20 times higher than the EO frequency comb scheme, and the threshold power is less than 90 mW which is about one order of magnitude lower than the Kerr frequency comb scheme.

4. The present application only needs one set of OFC generation system to realize two OFCs with different repetition rates, and has more compact structure and lower cost than conventional schemes. Moreover, since the pump laser and modulating signals are both generated by a single laser and a single RF source at the same time, which naturally are homologous driven and phase coherent; no additional synchronous or phase-locking device is required, which significantly simplifies the system structure along with lower noise.

5. The present application uses the active EOM to excite microcomb generation and uses the cascaded FWM for frequency expansion, so only requires laser pumping with fixed wavelength and avoids the strong dependence on fast-sweeping sources for other microcomb generation schemes. It is of great significance for the MIR region where high-performance laser sources are rare. This method is an internal modulation type, and compared with external schemes, no outer high-frequency modulation device is needed, which solves active generation difficulty for high-repetition-rate OFCs due to the lack of high-speed modulators in the MIR region. Meanwhile, such process does not require any complicated tuning procedures and thus, can be turnkey self-started and easy mode locked with strong robustness.

6. The present application adopts the dual OFCs passing through the to-be-tested sample at the same time (i.e., dual-comb dual-pass), which are then compared with the reference dual comb. Because the carrier containing the absorption spectrum information is a low-frequency signal, only a low-speed photoelectric conversion device is required to extract all frequency information efficiently, which solves the bandwidth limitation problem for MIR photodetectors compared with other single-pass methods.

7. The present application performs dual-frequency modulation on a single MRR to realize simultaneous generation of two OFCs. The repetition rate difference between two sets of OFCs can be flexibly controlled by the RF driven signals. Compared with other dual-comb generation schemes, it has not only higher control precision and wider tuning range, but also stronger thermal stability as does not need control the MRR temperature to vary the cavity length.

8. The present application implements photoelectric conversion first and then compares the two dual-comb paths, so the beam is combined in the oscilloscope electrically instead of combined spatially. Consequently, a set of optical reflectors and beam combining devices can be saved, which further reduces the system size and construction difficulty along with better stability.

9. The present application realizes the DCS measurement in the MIR region wherein the sensitivity is 1-2 orders of magnitude higher than other spectroscopies in the NIR and other regions, and hence may be suitable for more testable sample types and wider application areas.

The reference numbers in the figures are as follows: 1—narrow-linewidth c.w. laser source, 2—microscope objective, 3—$LiNO_3$ MRR, 4—RF generator, 5—beam splitter, 6—to-be-tested sample, 7—first MIR photoelectric detector, 8—adjustable attenuator, 9—second MIR photoelectric detector, and 10—oscilloscope.

DETAILED DESCRIPTION OF THE EMBODIMENTS

The present application will be further described below in conjunction with the drawings and specific embodiments.

Figure 1:
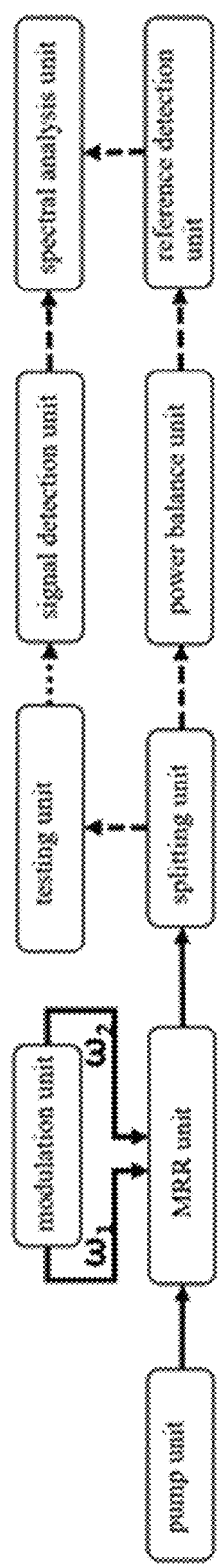
FIG. 1 is a frame diagram of principle for the present application.

Referring to FIG. 1, an embodiment provides a highly-integrated ultrahigh-resolution MIR DCS measurement device, including a pump unit used for providing a c.w. pump laser; a modulation unit used for providing dual-frequency modulating signal; an MRR unit used for generating broadband MIR dual combs; a splitting unit used for splitting MIR dual combs; a testing unit used for placing a to-be-tested sample; a signal detection unit used for providing absorption spectrum information; a power balance unit used for balancing the intensity difference between the dual OFCs; a reference detection unit used for providing reference spectrum information; and a spectral analysis unit used for measuring beat signals of the dual combs.

Figure 2:
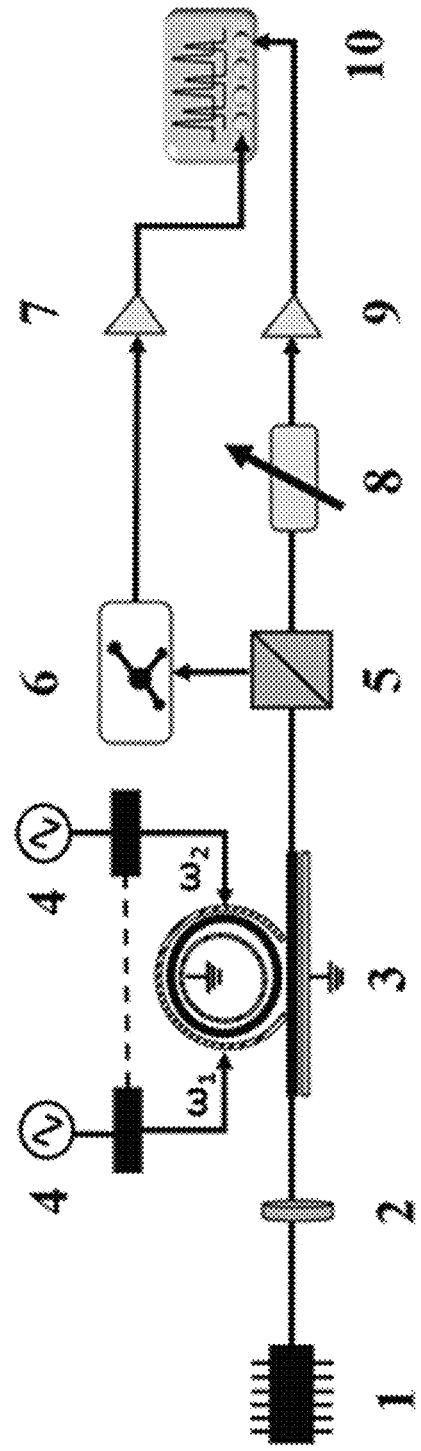
FIG. 2 is a schematic diagram showing the device structure of an embodiment of the present application.

Referring to FIG. 2, the pump unit of the embodiment includes a narrow-linewidth c.w. laser source 1 and a microscope objective 2 connected in sequence; the narrow-linewidth c.w. laser source 1 is used for providing the c.w. pump laser and the microscope objective 2 is used for efficiently coupling the c.w. laser source to the MRR unit. The MRR unit is a $LiNO_3$ MRR 3, used for receiving the pump laser and simultaneously generating two sets of MIR frequency combs with slightly different repetition rates through the EOM and FWM effects; in other embodiments, the MRR may be made of other materials, as long as the materials both possess the EO effect and third-order nonlinearity. The modulation unit is an RF generator 4, used for providing dual-frequency modulating signal and performing EOM on the MRR unit. The splitting unit is a beam splitter 5, used for splitting the MIR dual comb into a path of test light and a path of reference light. The testing unit is used for placing a to-be-tested sample 6 and performing testing. The signal detection unit is a first MIR photoelectric detector 7, used for performing photoelectric conversion on the test light after absorbed by the to-be-tested sample 6 and providing absorption spectrum information. The power balance unit is an adjustable attenuator 8, used for controlling the reference light intensity and balancing the intensity difference between the reference dual comb and the test dual comb after absorbed by the to-be-tested sample 6. The reference detection unit is a second MIR photoelectric detector 9, used for performing photoelectric conversion on the reference light and providing reference spectrum information. The spectral analysis unit is an oscilloscope 10, used for comparing beat signals of the dual combs to obtain the test spectrum information of the sample; and in other embodiments, a radio frequency analyzer, a vector signal analyzer or other electrical equipment may be used, as long as they can rapidly detect electric pulse signals.

It can be seen from FIG. 2 that in the highly-integrated ultrahigh-resolution MIR DCS measurement device of the embodiment, the microscope objective 2, the $LiNO_3$ MRR 3 and the beam splitter 5 are arranged in the emitting light path of the narrow-linewidth c.w. laser source 1 in sequence, the adjustable attenuator 8 and the second MIR photoelectric detector 9 are arranged in the transmission light path of the beam splitter 5 in sequence, the to-be-tested sample 6 and the first MIR photoelectric detector 7 are arranged in the reflection light path of the beam splitter 5 in sequence, and two input ports of the oscilloscope 10 are separately connected to the output ports of the first MIR photoelectric detector 7 and the second MIR photoelectric detector 9. In other embodiments, the adjustable attenuator 8 and the second MIR photoelectric detector 9 may be arranged in the reflection light path of the beam splitter 5 in sequence, and the to-be-tested sample 6 and the first MIR photoelectric detector 7 may be arranged in the transmission light path of the beam splitter 5 in sequence.

The $LiNO_3$ MRR 3 is monolithic-integrated with a bus waveguide and a ring resonator, wherein the input port of the bus waveguide is used for receiving the pump laser, and the output port thereof is used for coupling the generated combs outside the MRR; the ring resonator is used for generating the combs through the EOM and FWM process; the inner side and the outer side of the ring resonator need N-type doping and P-type doping, respectively and are connected to respective electrodes; the output port of the microscope objective 2 is connected to the input port of the bus waveguide of the $LiNO_3$ MRR 3; the input port of the beam splitter 5 is connected to the output port of the bus waveguide of the $LiNO_3$ MRR 3; two signal output ports of the RF generator 4 are both connected to the outer- (or inner-) side electrode of the ring resonator of the $LiNO_3$ MRR 3; and the inner- (or outer-) side electrode of the ring resonator of the $LiNO_3$ MRR 3 is grounded.

Specifically, the MIR DCS measurement may be realized by the following process:

1) adjusting the narrow-linewidth c.w. laser source 1 and the microscope objective 2, so as to ensure that the power of the emitted laser meets the threshold condition for the EOM and FWM process in the $LiNO_3$ MRR 3, and compressing the laser mode area to minimum and injecting the laser into the $LiNO_3$ MRR 3;

2) firstly disconnecting the circuit between the RF generator 4 and the $LiNO_3$ MRR 3, setting the center frequency for one channel of the RF generator 4 to equal the intrinsic resonant frequency of the $LiNO_3$ MRR 3, setting the center frequency for another channel as close to but not equaling the intrinsic resonant frequency of the $LiNO_3$ MRR 3 (the difference between two center frequencies is typically from some kHz to tens of MHz), then connecting the circuit between the RF generator 4 and the $LiNO_3$ MRR 3, and performing dual-frequency modulation on the $LiNO_3$ MRR 3;

3) in the case of dual-frequency modulation, automatically and simultaneously generating two sets of broadband MIR OFCs with slightly different repetition rates by the $LiNO_3$ MRR 3 through the EOM and FWM effect, and splitting the broadband MIR OFCs into a path of test light and a path of reference light by the beam splitter 5;

4) injecting the test light into the to-be-tested sample 6 for absorption testing, obtaining absorption spectrum information and then performing photoelectric conversion by the first MIR photoelectric detector 7; injecting the reference light into the adjustable attenuator 8 and adjusting the reference light to equal the intensities of reference dual comb and test dual comb, obtaining reference spectrum information and then performing photoelectric conversion by the second MIR photoelectric detector 9; and 5) separately receiving real-time signals of the first MIR photoelectric detector 7 and the second MIR photoelectric detector 9 by two different channels of the oscilloscope 10, and performing Fourier transformation and data processing on test results to obtain absorption spectrum of the to-be-tested sample.

The working principle of the present application is as follows:

Firstly, the power of the narrow-linewidth c.w. laser source 1 is adjusted to meet the threshold condition for the EOM and FWM and the laser is used as the pump laser of the $LiNO_3$ MRR 3 after compressing the mode area by the microscope objective 2; then the RF generator 4 is adjusted to enable two channels thereof to separately output RF signals with slightly different center frequencies and dual-frequency modulation is performed on the $LiNO_3$ MRR 3; two sets of broadband MIR combs with slightly different repetition rates are automatically and simultaneously generated by the $LiNO_3$ MRR 3 through the EOM and FWM effects and split into two paths by the beam splitter 5; one path as the test light is injected into the to-be-tested sample 6 for testing to obtain the absorption spectrum information, and photoelectric conversion is performed by the first MIR photoelectric detector 7; the other path as the reference light is injected into the adjustable attenuator 8 for intensity balancing between the two light paths to obtain the reference spectrum information, and photoelectric conversion is performed by the second MIR photoelectric detector 9; the oscilloscope 10 captures real-time signals of the first MIR photoelectric detector 7 and the second MIR photoelectric detector 9 simultaneously, and after Fourier transformation as well as data processing on test results, the absorption spectrum of to-be-tested sample can be acquired.

Figure 3:
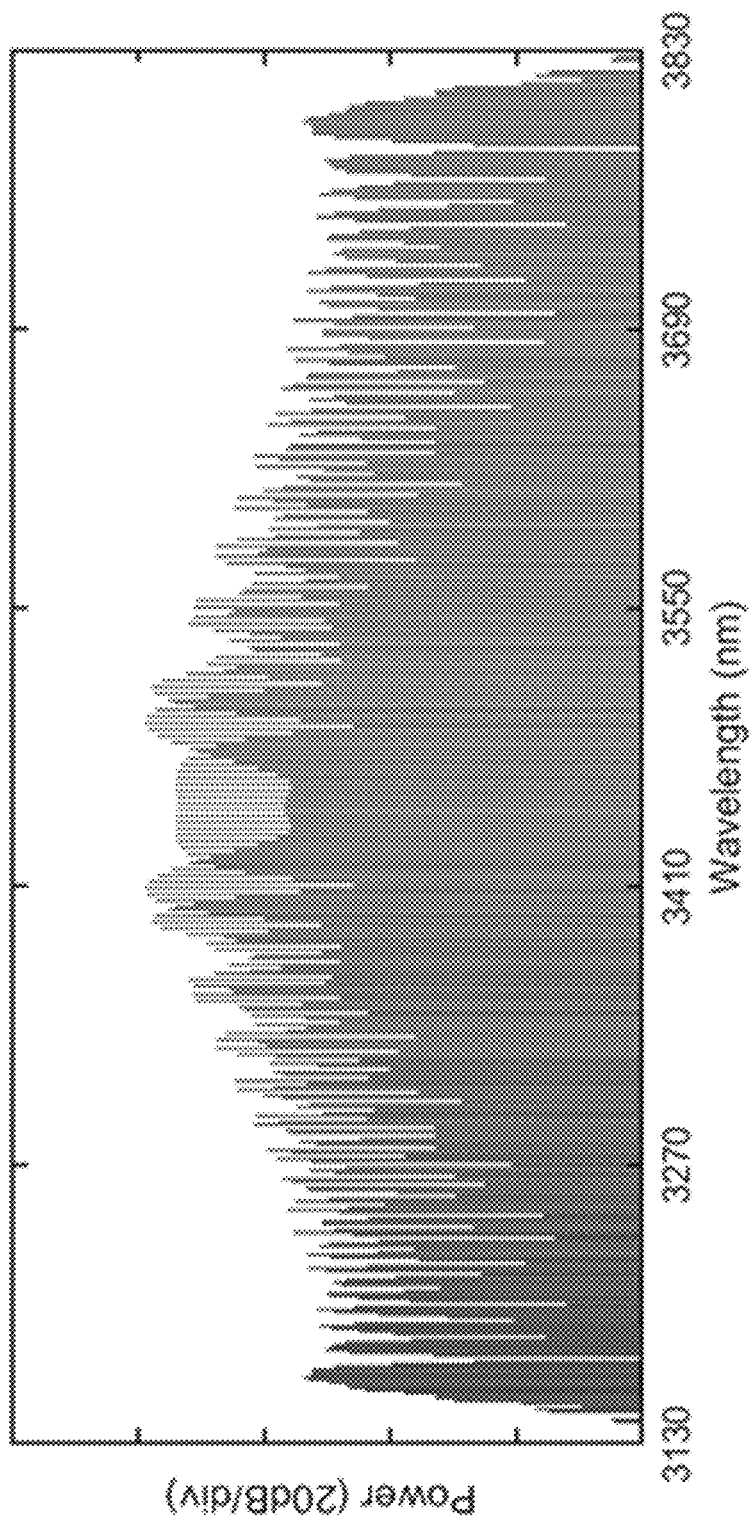
FIG. 3 is a spectral result for generated MIR dual comb.
Figure 4:
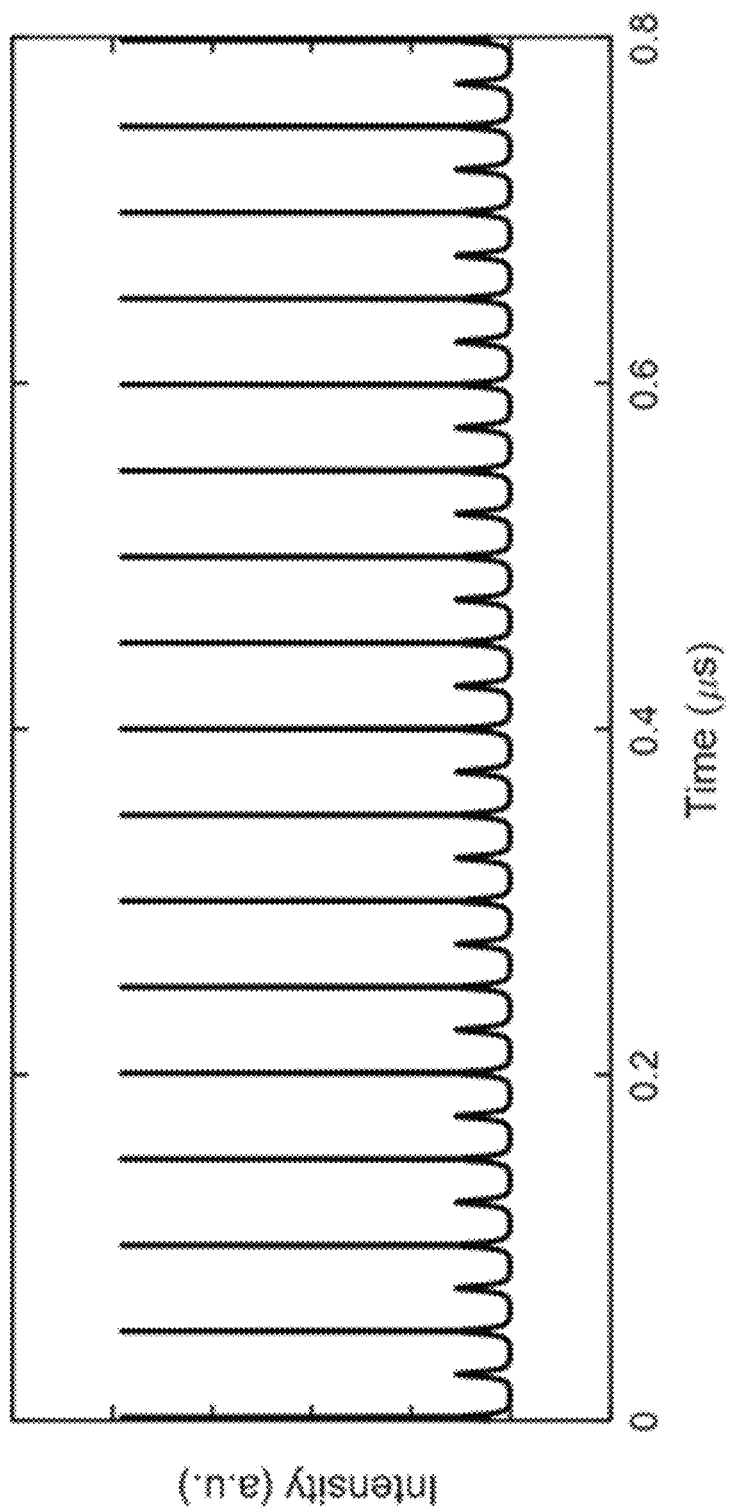
FIG. 4 is a temporal result for test dual comb directly measured by an oscilloscope.
Figure 5:
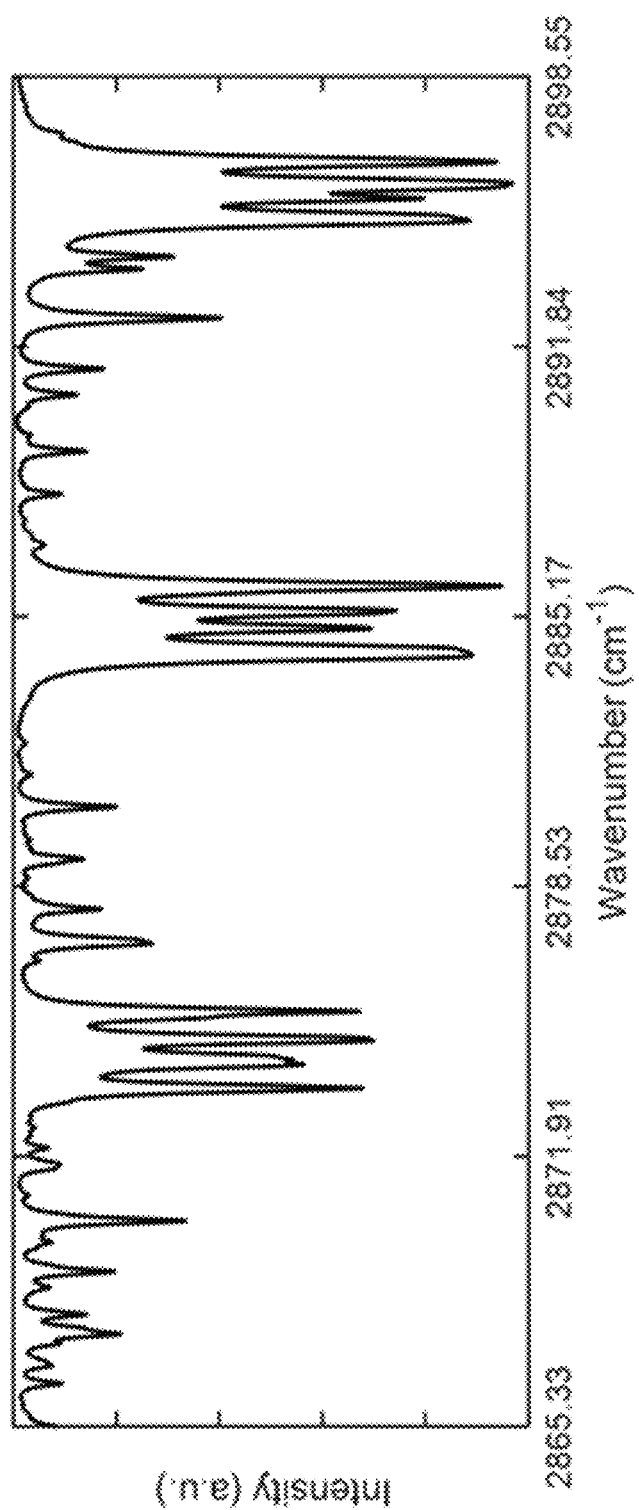
FIG. 5 is a typical absorption spectrum for the to-be-tested gas of $^{13}CH_4$.
Figure 6:
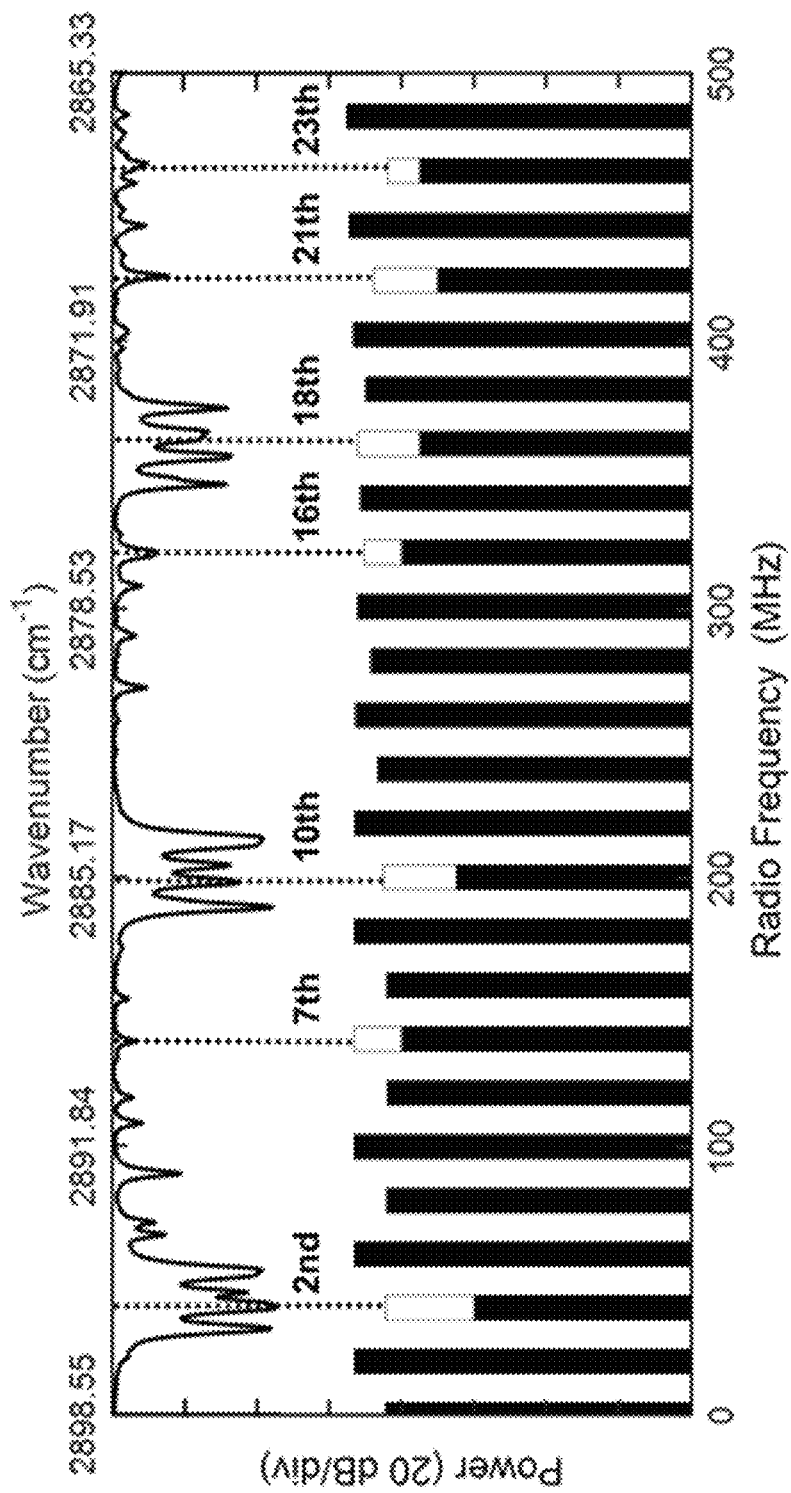
FIG. 6 is a comparison result in frequency domain after Fourier transformation.

Referring to a spectral result for generated MIR dual comb in FIG. 3 and a temporal result for test dual comb directly measured by an oscilloscope in FIG. 4, it can be seen from FIG. 3 that broadband MIR dual combs can be generated based on the EOM and third-order nonlinear effect, with a spectral coverage of 3130-3830 nm, repetition rate of 40 GHz, and bandwidth of larger than 700 nm. FIG. 4 shows direct measurement result in temporal domain for the dual combs with a repetition rate difference (i.e., f-f') of 20 MHz, corresponding to only 50 ns required for single measurement and 0.5 ms for 10,000 times of coherent averaging. FIG. 5 is a typical absorption spectrum for the to-be-tested gas of $^{13}CH_4$. FIG. 6 is a comparison result for frequency domain after Fourier transformation. It can be seen that seven teeth of the test dual comb passing the to-be-tested gas are absorbed distinctly with a ratio over 3 dB. In combination with FIG. 5, it can be known that by comparing the frequency information between the reference dual comb and the test dual comb, the absorption spectrum information of the to-be-tested gas can be extracted rapidly and efficiently. In addition, the measurement result well matches the characteristic absorption spectrum of the gas sample, indicating that performing the dual-frequency modulation on the LiNO$_3$ MRR can realize ultrahigh-resolution MIR DCS measurement.

The present application employs dual-frequency modulation on the LiNO$_3$ MRR with both strong second- and third-order nonlinearity, to achieve two sets of MIR combs simultaneous generation in a single MRR. The constructed spectral measurement device on this basis can save a whole set of OFC generation system, without the requirement for additional synchronous driven or phase-locking units, and thus be more compact with lower cost and better stability. Besides, by taking advantage of ultra-strong optical field confinement, flexible dispersion, and low linear loss in a wide range for the LiNO$_3$ MRR, the obtained MIR dual combs show the feature of >700 nm wide spectral bandwidth and <90 mW low threshold power. Using the ultrahigh-repetition-rate OFCs generated by the highly-integrated MRR as a test carrier, can break through the bottlenecks for conventional methods and achieve ultrahigh-resolution and ultrafast MIR DCS measurement. The realizable spectral resolution can be better than 10 kHz and the measurement time for multiple coherent averaging is less than 0.5 ms, which are improved by 3-4 and 4-5 orders of magnitude in comparison with the traditional FTIR approach, respectively. Furthermore, the repetition rate difference of the two OFCs can be flexibly adjusted through the dual-frequency modulation signal with high control precision and large tuning range, so the application range is very wide.

The invention claimed is:

1. An integrated mid-infrared (MIR) dual-comb spectroscopy (DCS) measurement device, comprising: a pump unit, a modulation unit, a microring resonator (MRR), a splitting unit, a testing unit, a signal detection unit, a power balance unit, a reference detection unit and a spectral analysis unit; wherein,
   the pump unit comprises a continuous-wave (c.w.) pump laser;
   the modulation unit provides dual-frequency modulating signal and performs electro- optic modulation (EOM) on the MRR unit;
   the MRR has both the electro-optic (EO) effect and the four-wave mixing (FWM) effect, receives an output of the c.w. pump laser and simultaneously-generates two sets of MIR combs with different repetition rates through the EOM and FWM process;
   the splitting unit splits the two sets of MIR comb into two paths comprising a test dual comb path and a reference dual comb path, one path being test light and the other path being reference light;
   the testing unit is used for placing a to-be-tested sample and performing testing;
   the signal detection unit performs photoelectric conversion on the test light after absorbed by the to-be-tested sample, providing absorption spectrum information and injecting the test light into the spectral analysis unit;
   the power balance unit balances the intensity difference between the test dual comb path and the reference dual comb path;
   the reference detection unit performs photoelectric conversion on the reference light, providing reference spectrum information and injecting the reference light into the spectral analysis unit; and
   the spectral analysis unit compares the beat signals of a test dual comb from the test dual comb path and a reference dual comb from the reference dual comb path to obtain spectral testing information of the sample.

2. The integrated MIR DCS measurement device of claim 1, wherein, the pump unit comprises a c.w. laser source and a microscope objective connected in sequence; the c.w. laser source provides the c.w. pump laser; and the microscope objective compresses the mode area of the pump laser and then injecting the c.w. pump laser into the MRR unit.

3. The integrated MIR DCS measurement device of claim 2, wherein, the MRR unit is a lithium niobate (LiNO$_3$) MRR.

4. The integrated MIR DCS measurement device of claim 3, wherein, the modulation unit is a radio frequency (RF) generator; two signal output ports of the RF generator are both connected to the outer-side electrode of the LiNO$_3$ MRR, and a common GND port of the RF generator is connected to the inner-side electrode of the LiNO$_3$ MRR; or, two signal output ports of the RF generator are both connected to the inner-side electrode of the LiNO$_3$ MRR, and a common GND port of the RF generator is connected to the outer-side electrode of the LiNO$_3$ MRR.

5. The integrated MIR DCS measurement device of claim 4, wherein, the splitting unit is a beam splitter; an input port of the beam splitter is connected to an output port of a bus waveguide of the LiNO$_3$ MRR; and output ports of the beam splitter are separately connected to the testing unit and the power balance unit.

6. The integrated MIR DCS measurement device of claim 5, wherein, the signal detection unit is a first MIR photoelectric detector; and the reference detection unit is a second MIR photoelectric detector.

7. The integrated MIR DCS measurement device of claim 4, wherein, the signal detection unit is a first MIR photoelectric detector; and the reference detection unit is a second MIR photoelectric detector.

8. The integrated MIR DCS measurement device of claim 3, wherein, the signal detection unit is a first MIR photoelectric detector; and the reference detection unit is a second MIR photoelectric detector.

9. The integrated MIR DCS measurement device of claim 2, wherein, the signal detection unit is a first MIR photoelectric detector; and the reference detection unit is a second MIR photoelectric detector.

10. The integrated MIR DCS measurement device of claim 1, wherein, the signal detection unit is a first MIR photoelectric detector; and the reference detection unit is a second MIR photoelectric detector.

11. The integrated MIR DCS measurement device of claim 10, wherein, the power balance unit is an adjustable attenuator.

12. The integrated MIR DCS measurement device of claim 11, wherein, the spectral analysis unit is an oscilloscope.

13. A method of performing MIR DCS measurement based on an integrated mid-infrared (MIR) dual-comb spectroscopy (DCS) measurement device, comprising: a pump unit, a modulation unit, a microring resonator (MRR), a splitting unit, a testing unit, a signal detection unit, a power balance unit, a reference detection unit and a spectral analysis unit; wherein, the pump unit comprises a continuous-wave (c.w.) pump laser;

the modulation unit provides dual-frequency modulating signal and performs electro-optic modulation (EOM) on the MRR unit;

the MRR has both the electro-optic (EO) effect and the four-wave mixing (FWM) effect, receives an output of the c.w. pump laser and simultaneously generates two sets of MIR combs with different repetition rates through the EOM and FWM process;

the splitting unit splits the two sets of MIR comb into two paths comprising a test dual comb path and a reference dual comb path, one path being test light and the other path being reference light;

the testing unit is used for placing a to-be-tested sample and performing testing;

the signal detection unit performs photoelectric conversion on the test light after absorbed by the to-be-tested sample, providing absorption spectrum information and injecting the test light into the spectral analysis unit;

the power balance unit balances the intensity difference between the dual combs path and the reference dual comb path;

the reference detection unit performs photoelectric conversion on the reference light, providing reference spectrum information and injecting the reference light into the spectral analysis unit; and the spectral analysis unit compares the beat signals of a test dual comb from the test dual comb path and a reference dual comb from the reference dual comb path to obtain spectral testing information of the sample, the method, comprising the following steps:

Step 1, adjusting the pump unit, so as to ensure that the emitted laser power meets the threshold condition for the EOM and FWM process in the MRR unit, and compressing the laser mode area to minimum and then injecting the laser into the MRR unit;

Step 2, adjusting the modulation unit to enable two channels thereof to separately output RF signals with different center frequencies and performing dual-frequency modulation on the MRR unit;

Step 3, in the case of dual-frequency modulation, automatically and simultaneously generating two sets of broadband MIR combs with different repetition rates by the MRR unit through the EOM and FWM process, and splitting the broadband MIR combs into a path of test light and a path of reference light by the splitting unit;

Step 4, injecting the test light into a to-be-tested sample for absorption testing, obtaining absorption spectrum information and then performing photoelectric conversion by the signal detection unit; injecting the reference light into the power balance unit and adjusting the reference light to equal the intensities of reference dual comb and test dual comb so as to enhance the signal contrast, obtaining reference spectrum information and then performing photoelectric conversion by the reference detection unit; and Step 5, separately receiving real-time signals of the signal detection unit and the reference detection unit by two different channels of the spectral analysis unit, and performing Fourier transformation and data processing on test results to obtain absorption spectrum of the to-be-tested sample.

14. The method of performing MIR DCS measurement of claim 13, wherein Step 1 comprises:

adjusting the c.w. pump laser emitted by the c.w. laser source, so as to ensure that the emitted laser power meets the threshold condition for the EOM and FWM in the MRR unit, and adjusting the microscope objective to compress the laser mode area to minimum and injecting the laser into the MRR unit.

15. The method of performing MIR DCS measurement of claim 14, wherein Step 2 comprises:

Step 2.1, disconnecting the circuit between the RF generator and the $LiNO_3$ MRR, setting the center frequency f for one channel of the RF generator as equaling the intrinsic resonant frequency of the $LiNO_3$ MRR, setting the center frequency f' of another channel as close to but not equaling the intrinsic resonant frequency of the $LiNO_3$ MRR, wherein the difference between f and f' is typically some kHz to tens of MHz while the output power is kept equal; and Step 2.2, connecting the circuit between the RF generator and the $LiNO_3$ MRR and performing dual-frequency modulation on the $LiNO_3$ MRR.

* * * * *